May 4, 1954  S. F. CYBULSKI  2,677,169
INDEXING DEVICE
Filed Feb. 5, 1951

INVENTOR:-
STEPHEN F. CYBULSKI
BY
Fisher + Christen,
ATTYS.

Patented May 4, 1954

2,677,169

UNITED STATES PATENT OFFICE 2,677,169

INDEXING DEVICE

Stephen F. Cybulski, Waterbury, Conn.

Application February 5, 1951, Serial No. 209,423

11 Claims. (Cl. 29—57)

This invention relates generally to indexing devices and methods and has particular relation to an indexing device which is adapted for use in conventional milling machines, lathes and the like.

One object of the present invention is to provide an indexing device which will make it possible to index a workpiece mounted on a screw machine, lathe or the like without removing the workpiece therefrom.

Another object of the present invention is to provide an indexing device which will utilize the sliding motion of the tail stock or turret on a screw machine, lathe or the like to permit engagement and indexing of the workpiece by means of the indexing device.

Still another object of the present invention is to provide an indexing device in the form of an attachment for a lathe, milling machine, screw machine or the like which will permit a workpiece mounted on the machine to be indexed through a predetermined angle without removing the workpiece therefrom.

Yet another object of the invention is to provide an indexing device in the form of an attachment for a lathe, screw machine, milling machine or the like which will permit the workpiece to be rotated through any predetermined portion of a circle so as to enable the cutting of geometric configurations on stock, slots and cross slots, holes and cross holes in the workpiece, holes in the face of the stock at index spacing, and many other operations heretofore performed with the workpiece removed from the machine.

Another object of the invention is to provide such an indexing device which will permit location of the workpiece for any boring or milling operation either horizontal or perpendicular to the axis of the workpiece, which workpiece may be of any shape such as rod stock, flat plate stock, etc.

These and other objects of the invention will be better understood by reference to the following description and accompanying drawing, in which.

Figure 1:
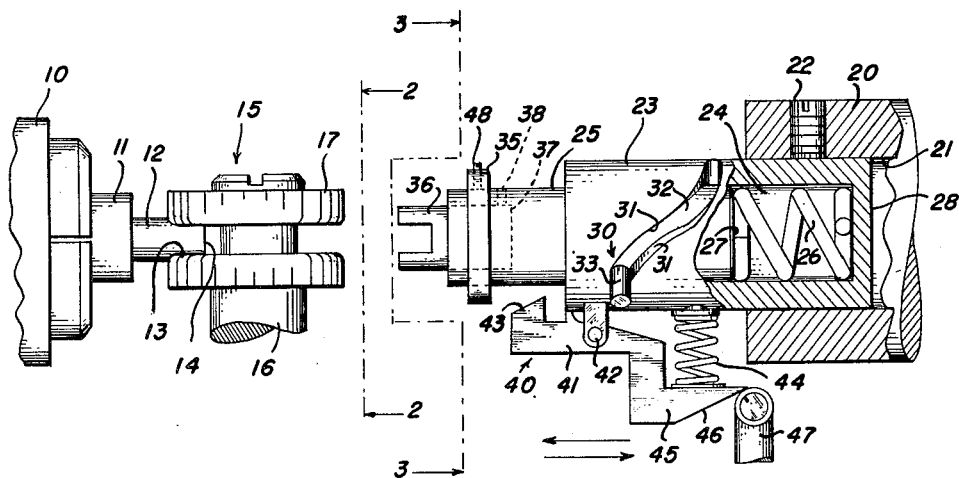
Fig. 1 is a side view, partially in section, showing an indexing device embodying the present invention in the form of a lathe attachment, the view being broken away to show only the head stock and tail stock portions of the lathe.

In general, the present invention comprises an indexing device for use on a lathe, milling machine or the like, comprising a fixed member, a member longitudinally movable with respect to said fixed member and adapted to engage a workpiece, a camming connection between said members so that said movable member is angularly turned an amount proportional to its longitudinal movement, and means for limiting the relative longitudinal movement between said fixed and movable members. Preferably, the limiting means is adjustably mounted on the movable member and the movable member is telescopically positioned in the fixed member. In a preferred embodiment latch means are provided for holding the interengaged members against relative axial movement. The present invention has been found particularly useful in the form of a combination with a lathe, milling machine or the like, and as an attachment for such machines. In a preferred embodiment, as shown, the latch means is adapted to engage the stop means and a trip means is included for releasing the latch means from holding the rotatable member from axial movement with respect to the fixed member. Also, in the preferred form of the invention, as shown, spring means are included for urging the rotatable member out of telescopic engagement with the fixed member and further spring means are provided for urging the latch means to position for holding the rotatable member against axial movement.

Referring now to the drawing, disclosing a preferred embodiment of the invention in the form of an attachment in combination with a milling machine, there is shown a conventional headstock 10 carrying a chuck 11 for holding a workpiece 12. The workpiece 12, as shown, has received a pair of parallel milled cuts 13 at its free end 14.

Adjacent the workpiece 12 is positioned a milling cutter, indicated generally at 15 and comprising driving shaft 16 mounted perpendicular to the axis of the workpiece 12 and carrying a pair of disc type milling cutters 17.

The tailstock 20, as shown, is conventional in form and is provided with an axial borehole 21 and a radial set screw 22. A cylindrical member 23 is adjustably and slidably mounted in the borehole 21 and is adapted to be fixed in the desired position by means of the set screw 22. In the form shown, the fixed member 23 is provided with an axial borehole 24 in which is slidably positioned a piston member 25. A spring element 26 is positioned between the inner end 27 of the piston and the base portion 28 of the cylindrical member 23 so as to urge the piston member 25 out of telescopic engagement with the cylindrical member 23.

A camming connection, indicated generally at 30, is provided between the fixed cylindrical member 23 and the movable piston member 25. In the form shown, the camming connection 30 comprises a cam and slot arrangement with the camming surfaces 31 provided by contact of the side walls of the slot 32 and the pin 33. The slot 32 is preferably in helical form in the wall of the fixed cylindrical member 23, the pin 33 being secured to the movable piston member 25.

The free end of the movable piston member 25 is provided with stop means in the form of a ring 35 which is adjustably positioned thereon, as by means of a set screw 48 so as to limit closing telescopic movement of the movable piston member 25 when the stop ring 35 abuts against the free end of the fixed cylindrical member 23. The free end of the movable piston member 25 is provided with means for engaging the workpiece 12, as shown in the form of a socket wrench member 36 adjustably carried in an axial borehole 37 in the free end of the movable piston member and fixed in the desired position, as by a set screw 38. In the form shown, the work-engaging member 36 is adapted to contact and mate with the pair of milled surfaces 13 formed on the free end 14 of the workpiece 12 by the pair of milling cutters 17. It will be apparent that the engaging means may be in the form of a conventional chuck or wrench.

Latch means, indicated generally at 40, is provided to prevent relative axial movement between the piston member 25 and the cylindrical member 23. In the form shown, a keeper or latch element 41 is pivotally secured to the cylindrical member 23 as by a hinge and pivot connection 42. The keeper end 43 of the latch element 41 is adapted to be cammed toward the open position by means of inward axial movement of the stop ring 35, the space between the keeper end 43 and the free end of the cylindrical member 23 being such as to snugly receive the stop ring 35 when it contacts the cylindrical member 23. In this position, the piston member 25 is held against axial movement in either direction. The latch 41 is spring biased to the latching position, as by spring 44 positioned between the cylindrical member 23 and the non-latching end 45 of the latch member 41. The end 45 of the latch is provided with a cam surface 46 for camming engagement with an abutment member 47 in the form of a rod, which is secured to the tail stock frame support (not shown).

In the operation of the present device in the form shown, an initial milling operation is performed on the free end 14 of the workpiece 12 to form the parallel mill cut surfaces 13 by means of the milling cutters 17. The milling cutters 17 are then moved out of engagement with the workpiece 12 and the tailstock 20 is advanced toward the headstock 10 to cause engagement of the engaging member 36 with the workpiece. Prior to such engagement, the piston member 25 is in the position shown in Fig. 1; that is, it is urged out of telescopic engagement with the cylinder member 23 with the pin 33 in the fully extended cam position.

The jaw or wrench 36 is rotatably adjusted and secured by means of the set screw 38 so as to fit onto the milled sides 13 of the workpiece as the tailstock 20 is carried forward. As the forward motion of the tailstock continues after engagement of the workpiece with the wrench 36, the piston member 25 is telescoped into the cylinder member 23 and simultaneously therewith, the piston member 25 is rotated an amount proportional to the axial movement by virtue of the camming engagement of the pin 33 against the camming surface 31 of the slot 32. The workpiece 12, being in engagement with the jaw or wrench 36 on the piston member 25, is likewise rotated the same amount.

The degree of rotation may be determined by the length, shape and positioning of the slot 32. Also, a set degree of rotation may be obtained upon full compression of the spring 26. Preferably, as shown, the degree of rotation is predetermined by the position of the ring 35 on the piston member 25 so that telescopic movement and rotation stop when the stop ring 35 abuts the free end of the cylinder member 23.

As the stop ring 35 approaches the free end of the cylinder member 23, it contacts the camming edge of the latch keeper 41 and pivots the latch to compress the latch spring 44 until the stop ring 35 clears the latch keeper and is in abutment with the cylinder member 23. At this point the latch 41 is urged to its normally closed position by expansion of the latch spring 44, thus preventing untelescoping movement and accompanying rotation of the piston member 25 when it is taken out of engagement with the workpiece 12 by return of the tailstock 20. Also, the stop latch 41 prevents untelescoping movement caused by expansion of the piston spring 26 so that the position of the workpiece 12 will remain fixed after it has been rotated the desired degree.

After the workpiece 12 has been indexed the desired degree of rotation, the piston member 25 is in telescoped position and is so held during the return movement of the tailstock 20, which movement causes disengagement of the workpiece and wrench 36. As the return movement of the tailstock 20 continues, the cammed surface 46 on the non-latching end 45 of the latch contacts the abutment rod 47 at the end of the stroke, thereby releasing the latch 41 and permitting the piston member 25 to return to the untelescoped position as caused by expansion of the piston spring 26. At this stage, the indexing device is in position for the next indexing stroke following the next milling operation.

Figure 2:
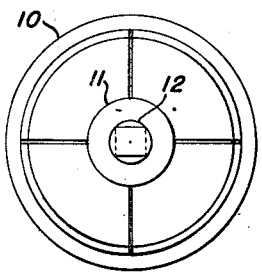
Fig. 2 is an end view, taken on the line 2—2 of Fig. 1, showing a milled square end on the workpiece, with the milling cutters omitted for clarity.
Figure 3:
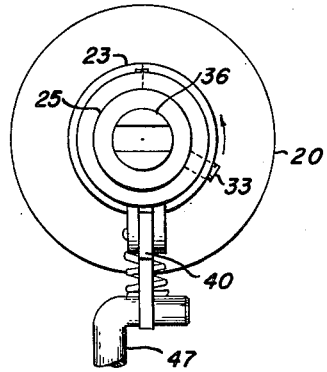
Fig. 3 is an end view, taken on the line 3—3 of Fig. 1.

It will be apparent that in the formation of a hexagonal head on a workpiece, the indexing device would be adjusted to give a 60 degree rotation to the workpiece and that this indexing step would be repeated two times. In the embodiment shown in Fig. 2 of the drawing, a square head is shown on the workpiece and this would require only a single repeat of the indexing step. As shown, a pair of parallel milling cutters is used where parallel miling cuts are desired. It will be apparent that various cutting, punching, drilling tools, etc. may be used on various types of workpieces. Also, it will be apparent that for certain machining operations, the workpiece may be held securely in a chuck (not shown), replacing the wrench 36 and, in this modification, no headstock is required.

In this form of the invention, the piston member 25 must be telescoped into the cylinder member 23. This may be accomplished by abutment of the workpiece against the headstock or other abutment means (not shown). Also, the workpiece must be held against rotation, as by means of a clamp (not shown) during the telescoping movement. Thus, the workpiece holder 36 may be provided with a one way clutch (not shown) as mounting means in the piston member 25.

While the invention has been described in a preferred embodiment, it will be apparent that various modifications and departures may be made by those skilled in the art and it is intended that such as come within the spirit and scope of the appended claims be considered a part of the present invention.

I claim:

1. In a lathe, milling machine or the like including a support for the workpiece and a second support, an indexing device for rotating the workpiece comprising a rotatable member axially movable into and out of engagement with said workpiece, a fixed member telescopically carrying said rotatable member, said rotatable and fixed members being interconnected by cam slot means so that said rotatable member may be turned through an angle proportional to its axial movement, stop means mounted on said rotatable member for limiting the axial movement of said last member, and latch means mounted on said fixed member for holding said rotatable member against axial movement.

2. The combination set forth in claim 1 wherein said latch means engages said stop means and further including means engageable with the latch means for disengaging the latch means from the rotatable member at one end of the movement of said rotatable member.

3. The combination set forth in claim 1 including trip means for releasing said latch means from holding said rotatable member against axial movement.

4. The combination set forth in claim 1 including spring means urging said rotatable member out of telescopic engagement with said fixed member.

5. The combination set forth in claim 1 including spring means urging said latch means to position for holding said rotatable member against axial movement.

6. An indexing device for use on a lathe, milling machine or the like, comprising a fixed member, a member longitudinally movable with respect to said fixed member and adapted to engage a workpiece, a camming connection between said members so that said movable member is angularly turned a portion of a single turn proportional to its longitudinal movement, and variably positioned means mounted on said movable member for limiting the relative longitudinal movement between said fixed and movable members and thereby controlling the angular turning imparted to said movable member.

7. The device set forth in claim 6, wherein said variably-positioned means includes a collar surrounding and longitudinally settable on said movable member in a position to engage said fixed member.

8. The device as set forth in claim 6 wherein said fixed member and said movable member are in telescopic engagement.

9. An indexing device for moving a workpiece comprising a holder for the workpiece, a turning device comprising two telescopically interengaged members, one of said members being movable axially into and out of engagement with the workpiece and a cam-slot connection between said members so that when said members are moved relatively axially of each other, that member in engagement with the workpiece is turned through a portion of a single turn proportional to such axial movement.

10. The device set forth in claim 9 including means for limiting the relative axial movement between said interengaged members.

11. The device set forth in claim 9 including latch means fixedly positioned on one of said interengaged members and adapted to engage the other of said interengaged members for holding said interengaged members against relative axial movement.

References Cited in the file of this patent

UNITED STATES PATENTS

| Number | Name | Date |
|---|---|---|
| 499,677 | Daelen | June 13, 1893 |
| 1,387,249 | Foulder | Aug. 9, 1921 |
| 1,708,766 | Lochner | Apr. 9, 1929 |
| 2,346,352 | Boxell | Apr. 11, 1944 |
| 2,491,559 | Hargrett et al. | Dec. 20, 1949 |

FOREIGN PATENTS

| Number | Country | Date |
|---|---|---|
| 580,908 | Great Britain | Sept. 24, 1946 |